United States Patent
Jordan et al.

[11] Patent Number: 6,062,920
[45] Date of Patent: May 16, 2000

[54] CUSTOM TERMINAL CONNECTOR FOR USE IN ELECTROCHROMIC DEVICES

[75] Inventors: Wayne M. Jordan, Grandville; Andy J. LeVesque, Holland; Michael U. Hoffmann, Hudsonville; Timothy A. Bonardi, Buchanan; Bradley L. Busscher, Grand Rapids, all of Mich.

[73] Assignee: Gentex Corporation, Zeeland, Mich.

[21] Appl. No.: 09/140,309

[22] Filed: Aug. 26, 1998

[51] Int. Cl.[7] .................................................... H01R 4/48
[52] U.S. Cl. ............................................................ 439/861
[58] Field of Search .................................. 439/861, 816, 439/830, 877

[56] References Cited

U.S. PATENT DOCUMENTS

| | | | |
|---|---|---|---|
| 3,051,773 | 8/1962 | Batcheller | 439/877 |
| 5,224,885 | 7/1993 | Youngfleish | 439/861 |
| 5,342,219 | 8/1994 | Onodera | 439/861 |

FOREIGN PATENT DOCUMENTS

| | | | |
|---|---|---|---|
| 61-61726 | 4/1986 | Japan . | |
| 63-137323 | 9/1988 | Japan | G02F 1/17 |
| 7-40977 | 9/1995 | Japan | G02F 1/155 |

OTHER PUBLICATIONS

Picture 1 is cross–sectional view of a prior art mirror made by Murakami. No date.
Picture 2 is a perspective view of a prior art mirror made by Murakami. No date.
Picture 3 is an expanded perspective view of a prior art mirror made by Murakami. No date.
Picture 4 is a perspective view of a prior art mirror made by Ichikoh. No date.

Primary Examiner—Khiem Nguyen
Assistant Examiner—Javaid Nasri
Attorney, Agent, or Firm—Brian J. Rees

[57] ABSTRACT

An improved custom terminal connector that may be used in electrochromic devices, the connector comprising an elongated unitary member integrally connected with a U-shaped crimping member. The custom terminal connector may be used to supply a potential from a power supply to a bus bar clip of an electrochromic device. The elongated unitary member has a resilient backwall section connecting a plurality of first resilient sections and a plurality of second resilient sections laterally spaced from the plurality of first resilient sections. The first and second resilient sections are integrally connected with the resilient backwall section and are laterally spaced from one another such that the elongated unitary member generally forms a "C" and the pressure points of the custom terminal connector on the bus bar clip generally oppose one another. The U-shaped crimping member has an insulation crimp to aid in securing the wire to the custom terminal connector, and a wire crimp for ensuring electrical conductivity between the wire and the custom terminal connector.

14 Claims, 2 Drawing Sheets

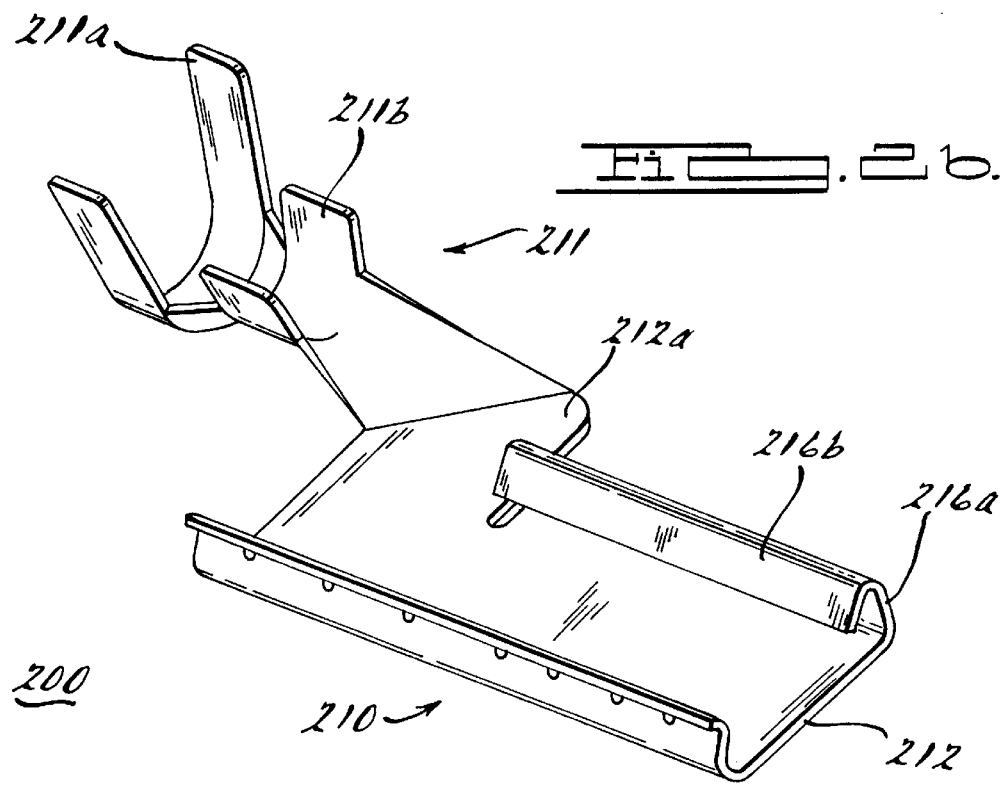
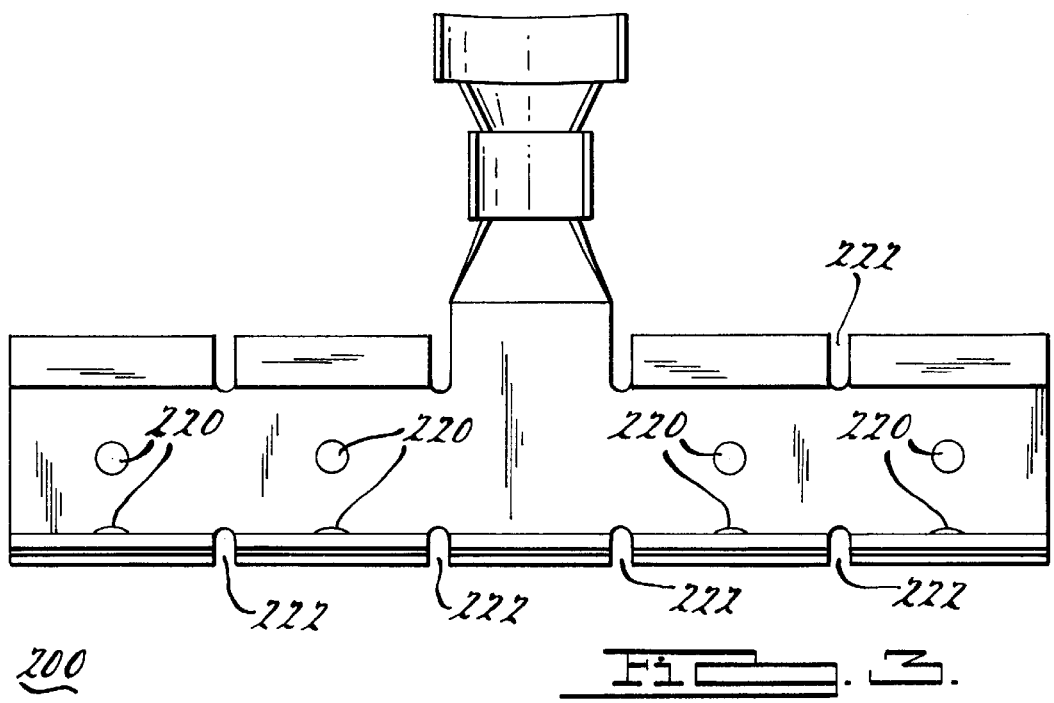

CUSTOM TERMINAL CONNECTOR FOR USE IN ELECTROCHROMIC DEVICES

BACKGROUND OF THE INVENTION

This invention relates to an improved custom terminal connector used to supply a potential to various devices, such as electrochromic devices, and more particularly, to an improved custom terminal connector comprising an elongated unitary member that attaches to a bus bar clip and a crimping member that attaches to a wire.

Heretofore, various automatic rearview mirrors for motor vehicles have been devised which automatically change from the full reflectance mode (day) to the partial reflectance mode(s) (night) for glare protection purposes from light emanating from the headlights of vehicles approaching from the rear. The electrochromic mirrors disclosed in U.S. Pat. No. 4,902,108, entitled "Single-Compartment, Self-Erasing, Solution-Phase Electrochromic Devices Solutions for Use Therein, and Uses Thereof", issued Feb. 20, 1990 to H. J. Byker; Canadian Patent No. 1,300,945, entitled "Automatic Rearview Mirror System for Automotive Vehicles", issued May 19, 1992 to J. H. Bechtel et al.; U.S. Pat. No. 5,128,799, entitled "Variable Reflectance Motor Vehicle Mirror", issued Jul. 7, 1992 to H. J. Byker; U.S. Pat. No. 5,202,787, entitled "Electro-Optic Device", issued Apr. 13, 1993 to H. J. Byker et al.; U.S. Pat. No. 5,204,778, entitled "Control System For Automatic Rearview Mirrors", issued Apr. 20, 1993 to J. H. Bechtel; U.S. Pat. No. 5,278,693, entitled "Tinted Solution-Phase Electrochromic Mirrors", issued Jan. 11, 1994 to D. A. Theiste et al.; U.S. Pat. No. 5,280,380, entitled "UV-Stabilized Compositions and Methods", issued Jan. 18, 1994 to H. J. Byker; U.S. Pat. No. 5,282,077, entitled "Variable Reflectance Mirror", issued Jan. 25, 1994 to H. J. Byker; U.S. Pat. No. 5,294,376, entitled "Bipyridinium Salt Solutions", issued Mar. 15, 1994 to H. J. Byker; U.S. Pat. No. 5,336,448, entitled "Electrochromic Devices with Bipyridinium Salt Solutions", issued Aug. 9, 1994 to H. J. Byker; U.S. Pat. No. 5,434,407, entitled "Automatic Rearview Mirror Incorporating Light Pipe", issued Jan. 18, 1995 to F. T. Bauer et al.; U.S. Pat. No. 5,448,397, entitled "Outside Automatic Rearview Mirror for Automotive Vehicles", issued Sep. 5, 1995 to W. L. Tonar; and U.S. Pat. No. 5,451,822, entitled "Electronic Control System", issued Sep. 19, 1995 to J. H. Bechtel et al., each of which patents is assigned to the assignee of the present invention and the disclosures of each of which are hereby incorporated herein by reference, are typical of modern day automatic rearview mirrors for motor vehicles. Such electrochromic mirrors may be utilized in a fully integrated inside/outside rearview mirror system or as an inside or an outside rearview mirror system. In general, in automatic rearview mirrors of the types disclosed in the above referenced U.S. patents, both the inside and the outside rearview mirrors are comprised of a relatively thin electrochromic medium sandwiched and sealed between two glass elements.

In most cases, when the electrochromic medium which functions as the media of variable transmittance in the mirrors is electrically energized, it darkens and begins to absorb light, and the more light the electrochromic medium absorbs the darker or lower in reflectance the mirror becomes. When the electrical voltage is decreased to zero, the mirror returns to its clear high reflectance state. In general, the electrochromic medium sandwiched and sealed between the two glass elements is comprised of solution-phase, self-erasing system of electrochromic materials, although other electrochromic media may be utilized, including an approach wherein a tungsten oxide electrochromic layer is coated on one electrode with a solution containing a redox active material to provide the counter electrode reaction. When operated automatically, the rearview mirrors of the indicated character generally incorporate light-sensing electronic circuitry which is effective to change the mirrors to the dimmed reflectance modes when glare is detected, the sandwiched electrochromic medium being activated and the mirror being dimmed in proportion the amount of glare that is detected. As glare subsides, the mirror automatically returns to its normal high reflectance state without any action being required on the part of the driver of the vehicle.

The electrochromic windows of the invention have similar construction and operation as the electrochromic mirrors of the invention except that the size or area can be much larger and a reflector layer is not needed.

For mirrors the electrochromic medium is disposed in a sealed chamber defined by a transparent front glass element, a peripheral edge seal, and a rear mirror element having a reflective layer. Conductive layers are provided on the inside of the front and rear glass elements, the conductive layer on the front glass element being transparent while the conductive layer on the rear glass element may be transparent or the conductive layer on the rear glass element may be semi-transparent or opaque and may also have reflective characteristics and function as the reflective layer for the mirror assembly. The conductive layers on both the front glass element and the rear glass element are connected through bus bar clips to electronic circuitry which is effective in electrically energizing the electrochromic medium to switch the mirror to nighttime, decreasing reflectance modes when glare is detected and thereafter allow the mirror to return to the daytime, high reflectance mode when the glare subsides as described in detail in the aforementioned U.S. patents. For clarity of description of such a structure, the front surface of the front glass element is sometimes referred to as the first surface, and the inside surface of the front glass element is sometimes referred to as the second surface. The inside surface of the rear glass element is sometimes referred to as the third surface, and the back surface of the rear glass element is sometimes referred to as the fourth surface.

Heretofore, bus bar clips have been used to impart a potential from a power supply to the transparent conductive layers of an electrochromic device through a wire. The wire is attached to the bus bar clips with solder using a soldering iron. This soldering iron process can cause problems with the solder joint by having either too little or too much solder in the joint. Too little solder can cause a structurally weak bond between the wire and the bus bar which may break and inhibit the flow of electricity to the electrochromic device. Too much solder can interfere with the mirror housing or the solder joint may be weakened through vibration. These limitations of a solder bond are exacerbated in the high vibration environment of motor vehicles.

In addition, the heat used to solder can cause significant problems in electrochromic devices. The soldering iron must not only heat up the solder so that it flows, but also the clip. The surrounding glass is a significant heat sink which may result in cold solder joints. Further, if the glass is overheated to ensure a proper solder joint, damage to the seal or electrochromic layer or both may occur. Differences in the coefficient of thermal expansion between the glass elements and the transparent conductors, or between the transparent conductors and the seal may cause delamination of the internal layers or may otherwise damage the integrity of the seal. Finally, the flux is corrosive to the seal.

Consequently, it is desirable to provide an improved custom terminal connector that provides high electrical contact stability over long periods of time when supplying potential to an electrochromic device, while eliminating any high-temperature soldering operations.

OBJECTS OF THE INVENTION

Accordingly, a primary object of the present invention is to provide an improved custom terminal connector comprising an elongated unitary member that attaches to a bus bar clip and a crimping member that attaches to a wire.

Another object of the present invention is to provide a connection between a wire and a bus bar clip that exhibits high electrical contact stability over long periods of time, even when the connection is exposed to a high vibration environment.

SUMMARY OF THE INVENTION

The above and other objects, which will become apparent from the specification as a whole, including the drawings, are accomplished in accordance with the present invention by providing an improved custom terminal connector comprising an elongated unitary member integrally connected with a U-shaped crimping member. The custom terminal connector is used to supply a potential from a power supply to a bus bar clip of an electrochromic device. The elongated unitary member has a resilient backwall section connecting a plurality of first resilient sections and a plurality of second resilient sections laterally spaced from the plurality of first resilient sections. The first and second resilient sections are integrally connected with the resilient backwall section and are laterally spaced from one another such that the elongated unitary member generally forms a "C" and the pressure points of the custom terminal connector on the bus bar clip generally oppose one another. The U-shaped crimping member has an insulation crimp to aid in securing the wire to the custom terminal connector, and a wire crimp for securing the wire and ensuring electrical conductivity between the wire and the custom terminal connector. Optionally, the U-shaped crimping device could be redesigned to be a "male" receptacle where a "female" connector would plug onto. In addition, the first and/or second resilient sections may optionally have at least one dimple adapted to bear against a surface of the underlying bus bar clips, and recesses in the first and second sections that allow bending in three directions.

BRIEF DESCRIPTION OF THE DRAWINGS

The subject matter which is regarded as the invention is particularly pointed out and distinctly claimed in the concluding portion of the specification. The invention, together with further objects and advantages thereof, may best be understood by reference to the following description taken in connection with the accompanying drawings, where like numerals represent like components, in which:

FIGS. 2a and 2b are perspective views of two embodiments of the custom terminal connector of the present invention; and FIG. 3 is a top view of the custom terminal connector incorporating optional dimples for improved electrical connection and optional recesses for improved flexibility.

DETAILED DESCRIPTION

Figure 1:
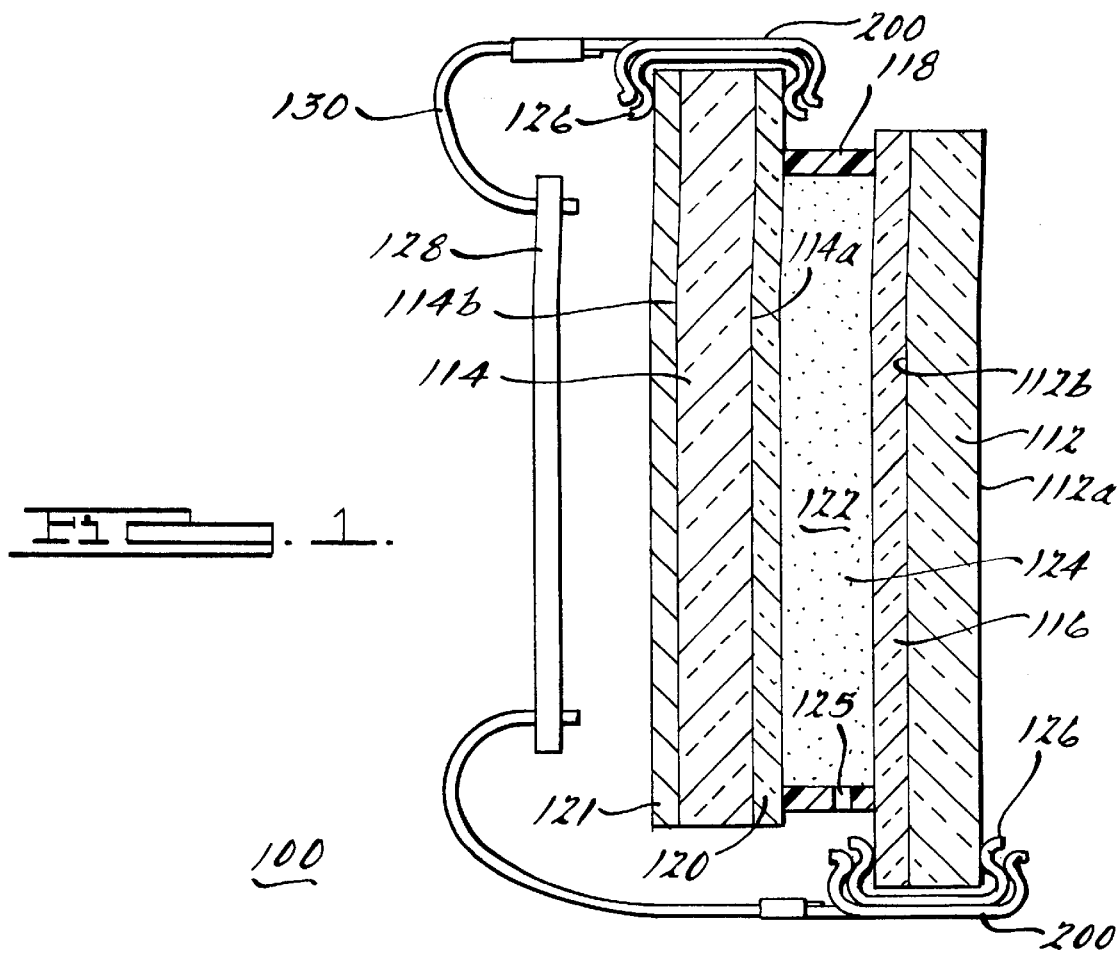
FIG. 1 is a cross-sectional view of an electrochromic device comprising the custom terminal connector of the present invention that is used to supply a potential to the electrochromic device.

FIG. 1 shows a cross-sectional view of an electrochromic device 100 which may be a mirror, a window, a display device and the like. Device 100 has a front transparent element 112 having a front surface 112a and a rear surface 112b, and a rear element 114 having a front surface 114a and a rear surface 114b. Since some of the layers of the device are very thin, the scale has been distorted for pictorial clarity. Also, for clarity of description of such a structure, the following designations will be used hereinafter. The front surface 112a of the front glass element will be referred to as the first surface and the back surface 112b of the front glass element as the second surface. The front surface 114a of the rear glass element will be referred to as the third surface, and the back surface 114b of the rear glass element as the fourth surface.

Front transparent element 112 may be any material which is transparent and has sufficient strength to be able to operate in the conditions, e.g., varying temperatures and pressures, commonly found in the environment where the electrochromic device is used. For example, in the automotive environment the temperature may vary from −40 degrees Fahrenheit to over 140 to 150 degrees Fahrenheit, whereas a display device or a window may not see such extremes. Front element 112 may comprise any type of borosilicate glass, soda lime glass, float glass or any other material, such as, for example, a polymer or plastic, that is transparent in the visible region of the electromagnetic spectrum. Front element 112 is preferably a sheet of glass with a thickness ranging from 0.017 inches to about 0.4 inches. Rear element 114 must meet the operational conditions outlined above, except that if the electrochromic device 100 is a mirror, rear element 114 does not need to be transparent, and therefore may comprise polymers, metals, glass, ceramics, and preferably is a sheet of glass with a thickness ranging from 0.017 inches to about 0.4 inches. If the electrochromic device 100 is an automotive mirror, the front and rear elements are sometimes thinner than if the electrochromic devices is a window because windows are often larger than automotive mirrors and may need the added strength that a thicker transparent element will provide.

One or more layers of a transparent electrically conductive material 116 are deposited on the second surface 112b to act as an electrode. Transparent conductive material 116 may be any material which: bonds well to front element 112 and maintains this bond when the epoxy seal 118 bonds thereto; is resistant to corrosion with any materials within the electrochromic device; is resistant to corrosion by the atmosphere; and has minimal diffuse or specular reflectance, high light transmission, neutral coloration and good electrical conductance. Transparent conductive material 116 may be fluorine doped tin oxide; tin doped indium oxide (ITO); a stack of FTO/ITO disclosed and claimed in co-pending U.S. patent application Ser. No. 08/831,812, entitled "An improved Electro-Optic Device Including a Low Sheet Resistance, High Transmission Transparent Electrode"; a stack of ITO/metal/ITO (IMI) as disclosed in "Transparent Conductive Multilayer-Systems for FPD Applications", by J. Stollenwerk et al., Digest of Technical Papers for the Society for Information Display's 1995 Display Manufacturing Technology Conference, page 111; and the materials described in above-referenced U.S. Pat. No. 5,202,787, such as TEC 20 or TEC 15, available from Libbey Owens-Ford Co. (LOF) of Toledo, Ohio. Similar requirements are needed for whatever is deposited onto the third surface 114a, whether it is another layer of transparent conductive material 120 (for windows or for display devices and mirrors with a fourth surface reflector 121) or a combined reflector/electrode.

The coating 120 of the third surface 114a is sealably bonded to the coating 116 on the second surface 112b near their outer perimeters by a sealing member 118. Preferably, sealing member 118 contains glass beads (not shown) to hold transparent elements 112 and 114 in a parallel and spaced apart relationship while the seal material cures. Sealing member 118 may be any material which is capable of adhesively bonding the coatings on the second surface 112b to the coatings on the third surface 114a to seal the perimeter such that electrochromic material 124 does not leak from chamber 122 while simultaneously maintaining a generally constant distance therebetween. Optionally, the layer of transparent conductive coating 116 and the layer on the third surface 120 (transparent conductive material or reflector/electrode) may be removed over a portion where sealing member is disposed (not the entire portion, otherwise the drive potential could not be applied to the two coatings). In such a case, sealing member 118 must bond well to glass.

Chamber 122 is defined by one or more layers of transparent conductive material 116 (disposed on front element rear surface 112b), another layer disposed on rear element front surface 114a comprising either a transparent conductive material 120 or a combination reflector/electrode, and an inner circumferential wall of sealing member 118. Electrochromic medium 124 is capable of attenuating light traveling therethrough and has at least one solution-phase electrochromic material in intimate contact with the layers of transparent conductive material 116 and at least one additional electroactive material that may be solution-phase, surface-confined, or electrodeposition. However, the presently preferred media are solution phase redox electrochromics, such as those disclosed in above-referenced U.S. Pat. Nos. 4,902,108; 5,128,799, 5,278,693; 5,280,380; 5,282,077; 5,294,376; 5,336,448. Co-pending U.S. patent application Ser. No. 08/832,596 entitled "AN IMPROVED ELECTROCHROMIC MEDIUM CAPABLE OF PRODUCING A PRE-SELECTED COLOR" discloses electrochromic media that are perceived to be gray throughout their normal range of operation. The entire disclosure of this application is hereby incorporated herein by reference.

A bezel 144 extends around the edge of the electrochromic device 100 and comes into contact with the first surface 112a at a point where the seal member 118 is hidden from view.

A potential is supplied to the layer or layers of transparent conductive materials (116 and/or 120) within the electrochromic device 100 through bus bar clips 126. An improved design for the bus bar clips 126 is described and claimed in co-pending U.S. patent application Ser. No. 08/917,643 entitled "AN IMPROVED CLIP FOR USE WITH TRANSPARENT CONDUCTIVE ELECTRODES IN ELECTROCHROMIC DEVICES." This application is hereby incorporated herein in its entirety by reference. Clips are generally "C" shaped and have an electrochromic device-accepting end with an opening dimension slightly less than the thickness of the transparent element of the electrochromic device, thereby allowing the clip to exert a force on the transparent element. This force will aid with electrical connection and will also help keep the clip from falling off the electrochromic device.

In accordance with the present invention, a potential is supplied from the electronics 128 through a wire 130 to the bus bar clips 126 within the electrochromic device 100 through an improved custom terminal connector 200. The electronics 128 typically comprise a printed circuit board, however, it will be understood by those skilled in the art that there are a variety of ways to design electronics to control the amount of current being supplied to the electrochromic device, and all such designs are a part of the present invention. The electronics 128 are typically mounted in the housing on alignment pins. Alternatively, the electronics may be supported by a backing attached to the fourth surface 114b and at least two support members holding the electronics 128 some distance from the backing.

Figure 2A:
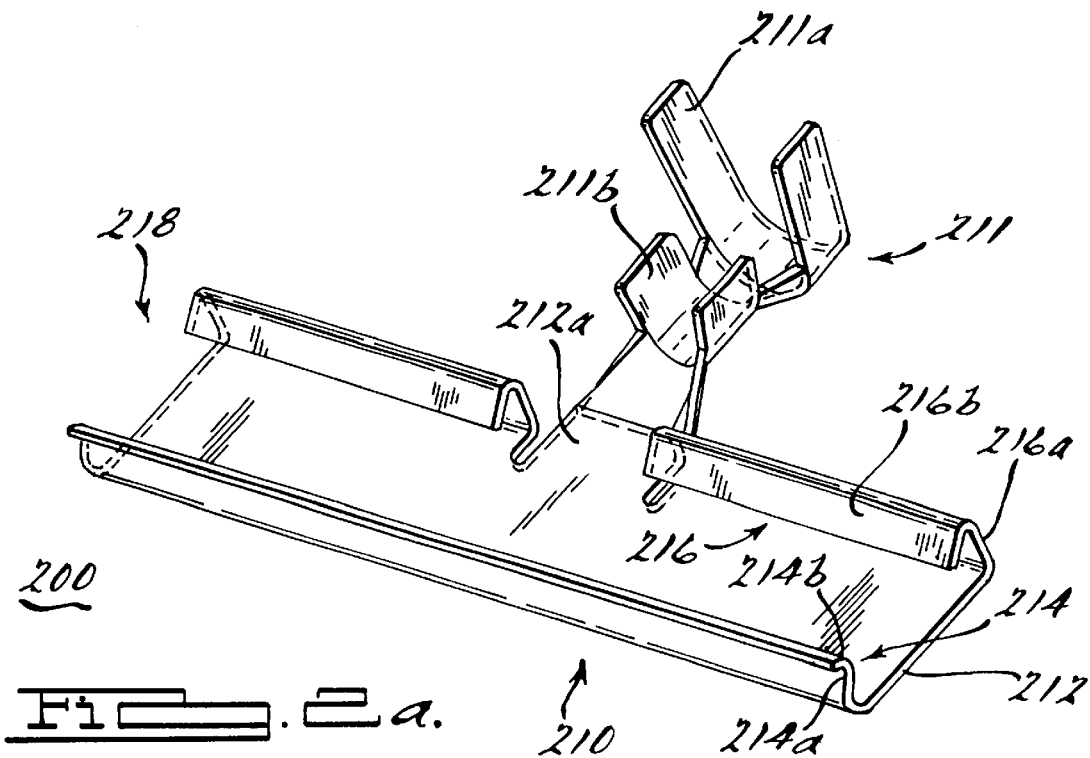

FIGS. 2a and 2b show two perspective views of a custom terminal connector 200 having an elongated unitary member 210 integrally connected with a crimping member 211. Referring initially to FIG. 2a, the elongated unitary member 210 has a resilient backwall section 212 connecting a plurality of first resilient sections 214 and a plurality of second resilient sections 216 laterally spaced from the plurality of first resilient sections 214. The first and second resilient sections (214 and 216) are integrally connected with the resilient backwall section 212 and are laterally spaced from one another such that the elongated unitary member 210 generally forms a "C" and the pressure points of the custom terminal connector on the bus bar clip generally oppose one another. The first resilient section 214 has, at the bus bar clip-accepting end 218, a portion that bows toward 214a and then flares away 214b from the second resilient section 216. The second resilient section 216 has, at the electrochromic clip-accepting end 218, a portion that is straight 216a and then flares 216b toward the first resilient section. As those skilled in the art will appreciate, the orientation of the first and second resilient sections may be reversed wherein the first resilient section flares in and the second resilient section flares out. Alternatively, the second resilient section 216 may be shaped like the first resilient section 214 and have a portion that bows in and then flares away from the first resilient section 214.

At the electrochromic clip-accepting end 218, the first and second sections are spaced apart at a distance slightly less than the thickness of the flared-in portions of the bus bar clip 126 that is attached to a transparent element of the electrochromic device. This allows the custom terminal connector 200 to snap onto the clip and apply pressure to the flared-in portion. Since the custom terminal connector opening is slightly smaller than the thickness of the flared-in portion of the clip 126, the custom terminal connector 200 will exert a force on the clip 126 that will aid with electrical connection and keep the custom terminal connector from falling off. This force is dependent on the custom terminal connector material properties, the custom terminal connector material thickness, the custom terminal connector shape and the initial and final throat gap. It will be understood by those skilled in the art that the dimensions of the custom terminal connector may be varied to fit the particular needs of an electrochromic device.

The crimping member 211 is integrally connected with the elongated unitary member 210. The orientation of this connection is not critical as long as there is sufficient electrical conductivity between the elongated unitary member and the crimping member to provide adequate potential to an electrochromic device. In one orientation shown in FIG. 2a, the crimping member 211 connects to the resilient backwall section 212 at a midpoint along the elongated unitary member 210. At this point, the backwall section 212 does not curve upward into a second resilient section 216, but extends coplanar with the backwall section at a tab portion 212a. This tab portion 212a is integrally connected with crimping member 211. In an alternate orientation shown in FIG. 2b, crimping member 211 connects to the resilient backwall section 212 at one end of the elongated unitary member 210. In addition, crimping member 211 may extend generally parallel with the axis of the elongated unitary member.

Crimping member 211 has an insulation crimp member 211a and a wire crimp member 211b. The insulation crimp member 211a is adapted to secure a portion of a wire (not shown) that still has an insulation housing surrounding the conductive wire. The insulated wire is secured by placing the wire into the bottom of the U-shaped portion and successively folding the two sections at the top of the U-shaped portion over the wire such that the wire is enveloped and secured. The wire crimp member 211b is adapted to secure a portion of a wire that does not contain insulation and therefore is also adapted to provide electrical connection between the custom terminal connector 200 and the wire. The wire crimp member 211b envelops and secures the conductive wire in a manner similar to the insulation crimp member 211a.

Optionally, the first and second resilient sections (214 and 216) and the resilient backwall section 212 of the custom terminal connector 200 may each have at least one dimple 220 (see FIG. 3) disposed thereon that is adapted to bear against the bus bar clip 126 (see FIG. 1). The dimples 220 contact the clip 126 and concentrate the contact force, thereby providing superior electrical contact. The dimples 220 may have a round, oval, elliptical, etc., cross-section. The size of the dimples may also vary, however, a radius of approximately 0.010 inches works very well in the context of an electrochromic mirror. However, any non-flat design which concentrates the contact force would accomplish the stable contact performance, and is therefore included as a part of the present invention.

FIG. 3 also shows how first and second sections (214 and 216) may have recesses 222 disposed therein such that the elongated unitary member 210 is capable of bending in three directions (i.e., the X, Y and Z axes). This flexibility allows easier attachment of the custom terminal connector to a curved surface and still adequately supply a potential to the underlying bus bar clip 126.

The custom terminal connector must form a stable contact with the underlying bus bar clip 126 for long periods of time which will differ depending on the nature of the electrochromic device. Electrochromic mirrors typically should have a lifetime that matches an automobile which is typically about 10 years. However, electrochromic windows, especially those placed in architectural windows must last the lifetime of a building which may be upwards of thirty years. If the custom terminal connector contacts are not stable for long periods of time, there is a significant chance that the window will fail to color and clear properly or will color and clear unevenly. Such a failure is aesthetically displeasing to a building or vehicle occupant and therefore unacceptable. Thus, in the present disclosure a long period of time generally means at least 10 years, and preferably more than about 20 years.

The custom terminal connector may also be fabricated from a variety of materials that possess sufficient resiliency, strength, conductivity and good corrosion resistance, such as those skilled in the art will appreciate. Resiliency and strength are important so that the custom terminal connector will bend so that it will engage the bus bar clip 126 of the electrochromic device and continue to exert a force. The conductivity must be sufficient to ensure adequate potential is being supplied to the electrochromic device. Finally the custom terminal connector must not excessively corrode over time such that its conductivity changes significantly over its expected lifetime. Materials useful in making the custom terminal connector are tin coated beryllium/copper alloys such as C17200-290 with a TM02 temper or C 174-10 with a ½HT temper, both available from Brush-Wellman Inc., Cleveland, Ohio, as well as a tin plated berillium-free copper alloy such as 7025 with a TM02 temper, available from Olin Corporation, East Alton, Ill. Other materials that may be used are ½ hard brass, phosphor bronze, or non-copper containing metals such as CMI-B Si steel, available from Cold Metal Products, Inc., Waterbury, Conn., stainless steel or high strength low carbon steels, such as ASTM A586 and ASTM 109, available from Thomas Steel Strip Corp., Warren Ohio. A stainless steel custom terminal connector has high enough resistance such that it is of marginal utility for a custom terminal connector. However, by plating the stainless steel with a high conductivity material such as tin, the resistance can be lowered enough to render it useful for custom terminal connectors. The plating also provides a better contact material than unplated stainless steel which may form metal oxides that are difficult to break through. High strength low carbon steels have surprisingly good electrical conductivity, good formability and excellent strength. Equally surprisingly, these steels exhibit excellent contact stability even in an unplated or uncoated form. The exposed surface of an uncoated steel bus clip will appear quite corroded and rusty, yet the contact resistance to a bus bar clip will be stable. This corrosion can be substantially retarded by coating the clip with an antioxidant or lubricant, such as WD-40 or Nye grease, or it may be plated with tin or more preferrably with a nickel based coat and then dip or plated tin top coat or both. Typically, the metal is plated in large coils, slit to width, stamped to shape and formed. This exposes unplated metal on the clip edge which can corrode. If desired, these edges may be coated with an antioxidant or grease or coating or the metal clips can be plated after forming so all exposed metal will be covered. The tin coatings may be applied in a molten tin dip or by a tin electroplate. The tin may have a thickness that ranges significantly, but it is typically from about 0.00002 to about 0.00008 inches.

As is known in the art, sliding contacts can be coated with lubricants, greases and the like to decrease oxide buildup on the metal contact and to lubricate the moving metal contact area during thermal cycling. In the electrochromic art, however, certain materials may not be as useful because they may become mobile as the temperature rises. For example, in automobiles it is common for the interior of the vehicle to reach upwards of 140 to 150 degrees Fahrenheit. At these temperatures, greases may start to run and flow down the outside of the glass element and impede the occupants rear view. It has been found that WD-40, available form the WD-40 Company, San Diego, Calif., when applied during the manufacturing process of these clips or after the clips have been formed but before the clips have been attached to the electrochromic device, provides significant corrosion protection even after the mineral spirit base has evaporated. Although not wanting to be held to any specific theory, it is presently believed that the mineral spirits evaporate and leave behind any antioxidants dissolved in the mineral spirits. Other commercially available lubricants that may be useful in certain electrochromic device applications include Anderol 732, available from Nuodex Inc., Piscataway, N.J.; NS-10195-G7, available from Syn-Tech, Addison, Ill.; and Nyetact 5026 and Nyogel 760G, available from Nye Lubricants, New Bedford, Mass.

In addition, it may sometimes be useful to provide a solder joint between the custom terminal connector 200 and the bus bar clip 126 by known techniques.

For electrochromic mirrors, light rays enter through the front glass 112, the transparent conductive layer(s) 116, at least one electrochromic material in chamber 122, the transparent conductive layer 120 and the back glass 114, before being reflected from the reflector 121 provided on the fourth surface 114b of the mirror 110. Light in the reflected rays exit by the same general path traversed in the reverse direction. Both the entering rays and the reflected rays are attenuated in proportion to the degree to which the electrochromic medium 124 is light absorbing. Alternatively, as stated above, the reflector may be placed on the third surface 114a in accordance with the disclosure of U.S. patent application Ser. No. 08/832,587 (now U.S. Pat. No. 5,818,625), entitled "ELECTROCHROMIC REARVIEW MIRROR INCORPORATING A THIRD SURFACE METAL REFLECTOR" filed on or about Apr. 2, 1997. The entire disclosure of this U.S. patent application is hereby incorporated herein by reference. In this case the third surface reflector doubles as an electrode and the transparent conductive layer 120 may optionally be deleted. Further, if the reflector is placed on the third surface 114a, a heater (not shown) may be placed on the fourth surface 114b in accordance with the teachings in the immediately above-referenced U.S. patent application.

The at least one electrochromic material may be a wide variety of materials capable of changing properties such that light traveling therethrough is attenuated but must be capable of being dissolved in the solvent. In order to balance charge during the electrochromic reactions, another redox active material must be present. This other material may include solution-phase redox, solid-state, and metal or viologen salt deposition; however, solution phase redox is presently preferred, such as those disclosed in above-referenced U.S. Pat. Nos. 4,902,108; 5,128,799; 5,278,693; 5,280,380; 5,282,077; 5,294,376; 5,336,448.

Electrochromic devices embodying the present invention preferably include a bezel (not shown), which extends around the entire periphery of each individual assembly 100. The bezel (not shown) conceals and protects the bus bar clips and the peripheral edge portions of sealing member 118 and both the front and rear glass elements 112 and 114. A wide variety of bezel designs are well known in the art, such as, for example the bezel taught and claimed in above-referenced U.S. Pat. No. 5,448,397. There are also a wide variety of housing well known in the art for attaching the mirror assembly 100 to the inside front windshield of an automobile, or for attaching outside mirror assemblies to the outside of an automobile. A preferred housing for attaching an inside assembly is disclosed in above-referenced U.S. Pat. No. 5,337,948.

The electrical circuit (see 128 of FIG. 1) preferably incorporates an ambient light sensor (not shown) and a glare light sensor (not shown), the glare light sensor being positioned either behind the mirror glass and looking through a section of the mirror with the reflective material completely or partially removed, or the glare light sensor can be positioned outside the reflective surfaces, e.g., in the bezel.

While the invention has been described in detail herein in accordance with certain preferred embodiments thereof, many modifications and changes therein may be effected by those skilled in the art without departing from the spirit of the invention. Accordingly, it is our intent to be limited only by the scope of the appending claims and not by way of the details and instrumentalities describing the embodiments shown herein.

What is claimed is:

1. An electrochromic device, comprising:

two spaced apart transparent elements, at least one having an electrically conductive coating disposed on a surface of the transparent element that faces the other transparent element;

a sealing member disposed near the outer perimeters of the spaced apart transparent elements to define a chamber;

an electrochromic medium disposed in the chamber;

a bus bar clip for imparting a potential to the at least one electrically conductive coating;

a custom terminal connector adapted to bear against the bus bar clip, the custom terminal connector comprising:

(a) an elongated unitary member having a resilient backwall section integrally connecting a first resilient section and a second resilient section, where said first and second resilient sections are laterally spaced from one another such that said elongated unitary member generally forms a "C" shape; and (b) a crimping member integrally connected with said elongated unitary member and having an insulation crimping member adapted to secure a portion of an insulated wire, and a wire crimp member adapted to secure a non-insulated portion of the wire and to provide electrical connection between said wire and said custom terminal connector.

2. The electrochromic device of claim 1, wherein said first resilient section has a portion that bows toward and then flares away from said second resilient section, and where said second resilient section has a portion that is straight and then flares toward said first resilient section.

3. The electrochromic device of claim 2, wherein said first resilient section or said backwall section includes at least one dimple.

4. The electrochromic device of claim 1, wherein said second resilient section has a portion that bows toward and then flares away from said first resilient section, and where said first resilient section has a portion that flares toward said second resilient section.

5. The electrochromic device of claim 4, wherein said second resilient section or said backwall section includes at least one dimple.

6. The electrochromic device of claim 1, wherein said first resilient section has a portion that bows toward and then flares away from said second resilient section, and where said second resilient section has a portion that bows toward and then flares away from said first resilient section.

7. The electrochromic device of claim 6, wherein said first resilient section, or said second resilient section, or said backwall section includes at least one dimple.

8. The electrochromic device of claim 1, wherein said crimping member is integrally connected with said resilient backwall section at a midpoint of said elongated unitary member at a backwall tab portion, and extends therefrom into a U-shape.

9. The electrochromic device of claim 1, wherein said first and second resilient sections have recesses disposed therein.

10. The electrochromic device of claim 1, wherein said elongated member is coated with a lubricant.

11. The electrochromic device of claim 1, further comprising a housing.

12. The electrochromic device of claim 1, where each of the transparent elements have an electrically conductive coating disposed on the surface of the transparent element that faces the other transparent element.

13. The electrochromic device of claim 12, where each of electrically conductive coatings is transparent.

14. The electrochromic device of claim 12, where one of the electrically conductive coatings is transparent and the remaining electrically conductive coating is reflective.

* * * * *